J. E. BENNETT.
WAVE OR CURRENT MOTOR.
APPLICATION FILED JULY 6, 1909.
958,467.
Patented May 17, 1910.
2 SHEETS—SHEET 1.
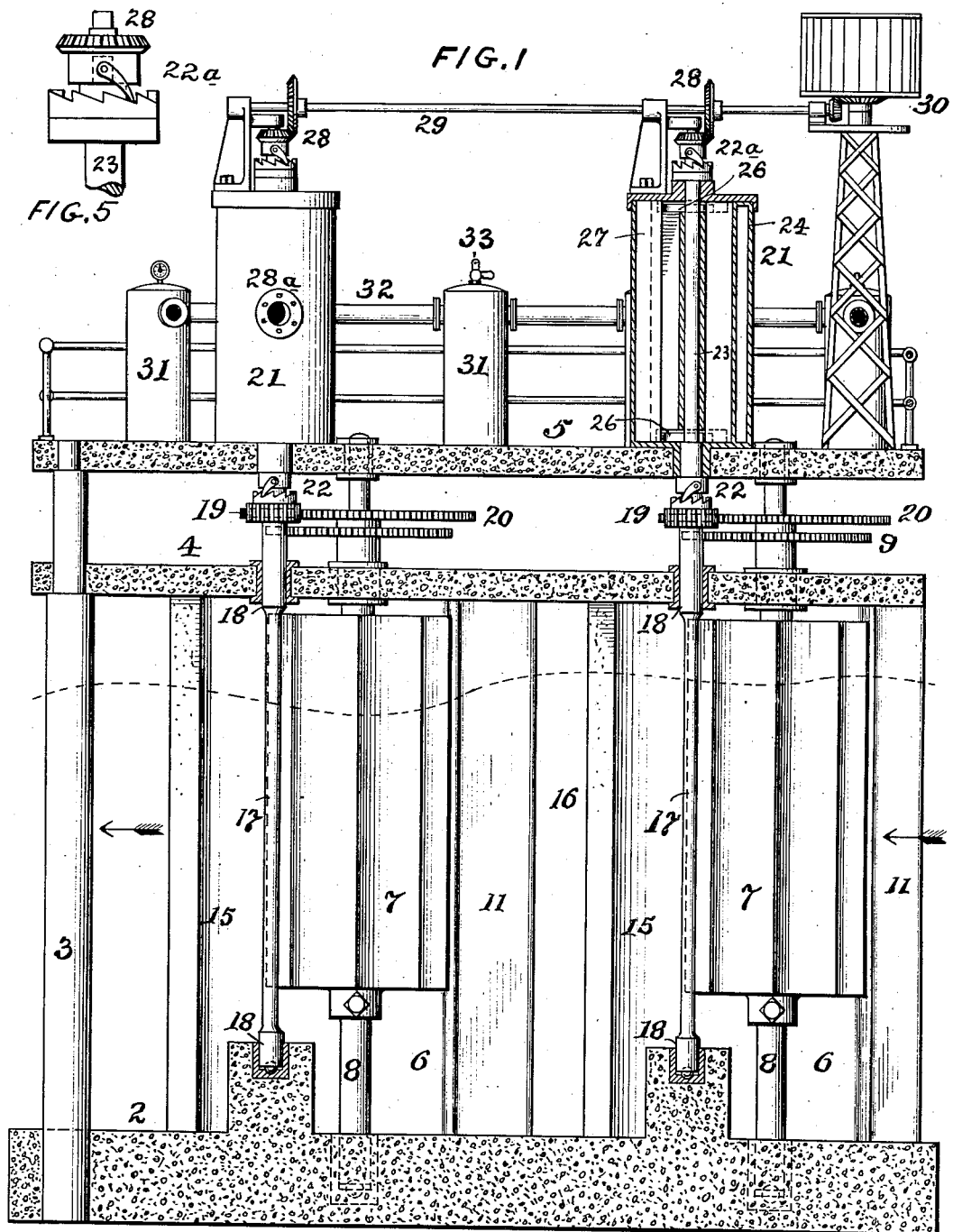
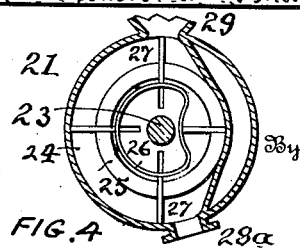

J. E. BENNETT.
WAVE OR CURRENT MOTOR.
APPLICATION FILED JULY 6, 1909.

958,467.

Patented May 17, 1910.

2 SHEETS—SHEET 2.

Witnesses

Inventor
James E. Bennett
By
Attorney

UNITED STATES PATENT OFFICE.

JAMES E. BENNETT, OF ATLANTIC CITY, NEW JERSEY.

WAVE OR CURRENT MOTOR.

958,467.

Specification of Letters Patent.

Patented May 17, 1910.

Application filed July 6, 1909. Serial No. 506,017.

*To all whom it may concern:*

Be it known that I, JAMES E. BENNETT, a citizen of the United States, and a resident of Atlantic City, county of Atlantic, and State of New Jersey, have invented an Improvement in Wave or Current Motors, of which the following is a specification.

My invention has reference to wave or current motors, and consists of certain improvements which are fully set forth in the following specification and shown in the accompanying drawings which form a part thereof.

The object of my invention is to provide a construction of wave motor which may utilize the power of waves to the greatest possible advantage, and more particularly to permit a wave after partly expending its force in the generation of power to repeat the operation one or more times, this result being attained by extracting from the power of the wave a portion of its force without materially disturbing the travel of the wave through the apparatus, and because of which the same wave is able to repeat the operation of giving up a portion of its force.

Figure 2:
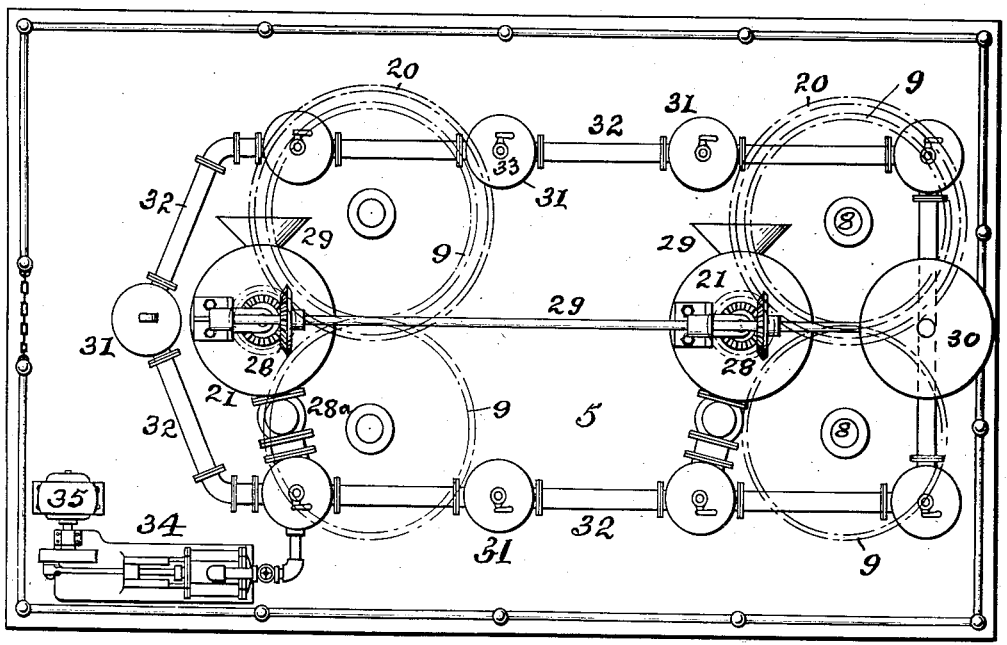
Figure 3:
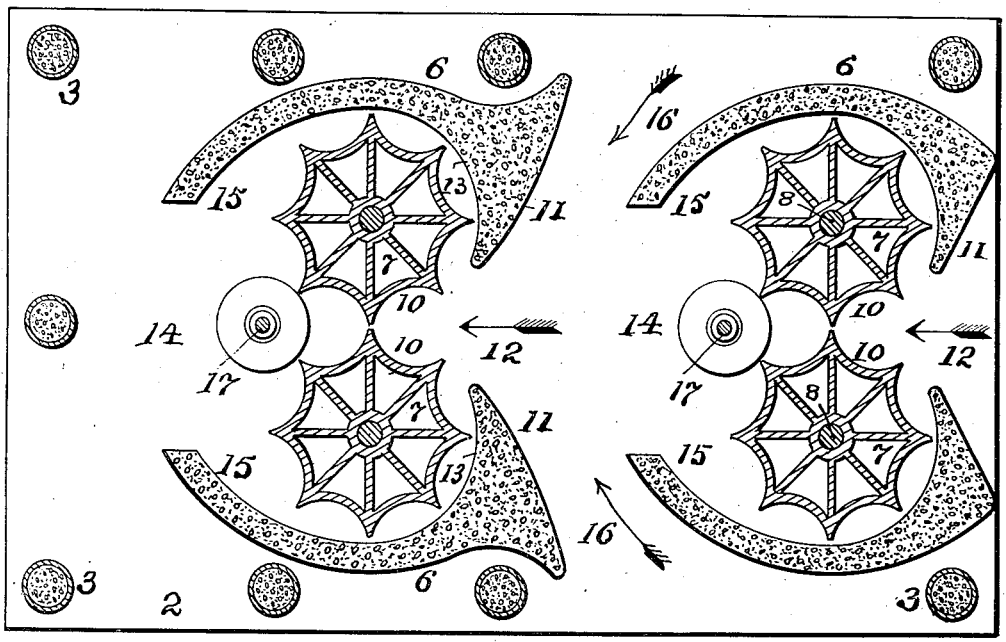

My invention consists of features of construction which are fully described in the specification, and more particularly defined in the claims, and these improvements will be better understood by reference to the drawings, in which:

Figure 1 is a sectional elevation of a wave motor embodying my invention; Fig. 2 is a plan view of the same; Fig. 3 is a sectional plan view of the same below the water level; Fig. 4 is an inverted sectional view of one of the compressors; and Fig. 5 is an elevation of one of the clutch devices.

2 is the foundation of the wave motor and may be made of concrete.

3 are concrete piles which support at a distance above the water two floors, namely, a lower floor 4 and an upper floor 5. Between the lower floor and the foundation are arranged the wave motor wheels 7 and these are inclosed by concrete walls 6 which extend vertically and have substantially the cross section illustrated in Fig. 3. The wheels 7 are of simple construction and each has a central shaft 8 journaled in suitable bearings in the foundation and in the floor 4, and are geared together in pairs by gearing 9 arranged above the floor 4 and below the floor 5. Secured to the shafts 8 are the wheels proper 7, and these are provided with curved buckets 10, and so arranged that when they rotate the highest points of the buckets of the two coöperating wheels come close together, preferably without touching, as indicated in Fig. 3. When the wave travels, as indicated by the arrows, it strikes upon these buckets and causes the wheels to rotate, while permitting the wave to pass between them. To insure the proper delivery of the wave to the wheels, I provide peculiar construction to the vertical walls or abutments 6. For a little more than a quarter of the circumference of the wheel these walls are concentric with the wheel, as shown at 13, and the forward or entrance portion of the abutment is inclined, as at 11, so that these parts on the opposite walls form a vertical throat 12 through which the water is guided and by which its speed of motion is accelerated so that it strikes the blades of the wheel with greater force than would be the case with the same water traveling at the normal speed of the wave. The rear portions 15 of these abutments are extended rearwardly away from the wheels and leaving a very much wider opening for the free passage of the water after expending its force upon the wheels. Furthermore, the space between the rear part of the wheels and the abutments 15 is made large so that the rotation of the wheels will have opportunity for the buckets to clear themselves of the water pressure, and thereby prevent back pressure upon the wheels and interference with the free travel of the water to the next pair of wheels in the rear.

As seen from Fig. 3, the second pair of wheels is the same in general construction as the first pair, but the abutments 6 have the flaring walls 11 made somewhat more extended so as to form clearly defined lateral passages 16 to catch portions of the water of the waves which pass to the outside of the first abutment walls 6, so that whatever 'oss in force is sustained by the wave in passing the first pair of wheels, is augmented by the additional force of the water coming through the passages 16 and in this way producing by the second set of wheels approximately the same power as is produced by the first set. This same operation may be repeated as often as desired. The water of the second wheel passes from the free discharge through the passage-way 14 from the first pair of wheels directly in line with the throat 12 of the abutments of the second pair of wheels and also through the passages 16, as indicated by the arrows, and all of this water is put into increased motion by the flared character of the walls 11.

17 is a power shaft journaled to the rear of the pair of wheels in bearings 18 and is driven by means of a spur-gear 20 on one of the shafts 8, and a pinion 19 on the shaft 17. This shaft 17 may be utilized for operating any suitable power storage or transmitting mechanism. In the particular construction shown, it is utilized for operating an air compressor 21, the shaft 23 of which is driven by means of a pawl and ratchet coupling device 22. The compressor 21 is supported upon the floor 5 immediately above the end of the shaft 17.

The compressor may be of any suitable construction. In the particular form shown, it consists of a cam shaped casing 24 having a central shaft 23 provided with a drum 25 provided with radial piston blades 27 which are kept in working contact with the inner surface of the cylinder by a spring 26 arranged at each end of the cylinder.

29 is an inlet for the air, and 28ª is a discharge outlet for the compressed air and this is delivered into the storage tanks 31 which are connected by suitable pipes 32. The compressed air from these tanks may be utilized in any suitable manner. In the particular use shown it is employed to operate an engine 34 which drives a drum 35 for the production of electric light or power. The compressed air may also be utilized for operating signal whistles 33 for any suitable purpose, such as a life saving station. To assist the wave motor and also for operation of the compressors when the water is still, I provide a wind mill 30 which may be of any size desired or suitable for the purpose, and connect the same with the compressors by means of a shaft 29, gearing 28, and pawl and ratchet clutch mechanism 22ª. These pawl and ratchet clutch mechanisms 22 and 22ª will permit the compressors to be driven by the wave motor or by the wind mill, or by both combined, and if either one of the power devices tends to run faster than the other, the compressor is operated by that which runs the faster and relieves that which is running slower. It will be understood that if the wind mill was not in operation but the wave motor was in operation, then the clutch 22 will operate to drive the compressor while the ratchet wheel will travel freely under the pawl of the clutch 22ª, and on the other hand, if the wave motor was not in operation and the wind mill was in operation, then the pawl of the clutch device 22 will travel freely over the ratchet teeth on the pinion 19.

While I have shown the shaft 17 as extending downward back of the wheels 7 so as to get a long support for the shaft, it is evident that this shaft 17 may be located wholly above the wheel by omitting the lower portion thereof.

My invention in its broadest scope may consist in one pair of wheels with the connecting devices and associated abutments, but in the more developed form of the invention, I employ two or more sets of wheels arranged one back of the other for the reasons already stated. It is furthermore to be understood that a wave motor power plant of the character herein set out is designed for use near the shore of the ocean in which the waves travel toward the beach and are in the most satisfactory condition for the operation of the wheels, but it will also be understood that my invention may be employed as a current motor in swiftly traveling streams or by the provision of suitable dams for direct and rapid flow of water through the throats 12 and 16.

I do not restrict myself to the details of construction, as these may be modified in various ways without departing from the spirit of the invention.

Having now described my invention, what I claim as new and desire to secure by Letters Patent, is:

1. In a wave or current motor, the combination of two vertical wheels having their peripheries provided with a series of upright buckets and between which wheels the water is permitted to flow to rotate the wheels in opposite directions, with vertical shafts for the wheels, connecting gearing between the shafts to cause the wheels to rotate with proper relative speeds, and vertical abutment walls having their forward portions curved to closely surround the forward and outer parts of the wheels and form a tapering throat directed between the wheels so that the water is guided intermediate of the wheels and also having rearwardly extending parts arranged at a gradually increasing distance from the wheels and forming a large discharge aperture to the rear of the wheels and throat portion.

2. In a wave or current motor, the combination of two vertical wheels having their peripheries provided with a series of upright buckets and between which wheels the water is permitted to flow to rotate the wheels in opposite directions, with vertical shafts for the wheels, connecting gearing between the shafts to cause the wheels to rotate with proper relative speeds, vertical abutment walls having their forward portions curved to closely surround the forward and outer parts of the wheels and form a tapering throat directed between the wheels so that the water is guided intermediate of the wheels and also having rearwardly extending parts arranged at a gradually increasing distance from the wheels and forming a large discharge aperture to the rear of the wheels and throat portion, an air compressing device having a separate shaft, and speed multiplying gearing between the air compressing shaft and one of the water wheels.

3. In a wave or current motor, the combination of two vertical wheels having their peripheries provided with a series of upright buckets and between which wheels the water is permitted to flow to rotate the wheels in opposite directions, with vertical shafts for the wheels, connecting gearing between the shafts to cause the wheels to rotate with proper relative speeds, vertical abutment walls having their forward portions curved to closely surround the forward and outer parts of the wheels and form a tapering throat directed between the wheels so that the water is guided intermediate of the wheels and also having rearwardly extending parts arranged at a gradually increasing distance from the wheels and forming a large discharge aperture to the rear of the wheels and throat portion, an air compressing device having a separate shaft, speed multiplying gearing between the air compressing shaft and one of the water wheels, storage reservoirs in communication with the compressors and power devices driven by the compressed air from the storage reservoirs.

4. In a wave or current motor, the combination of two vertical wheels having their peripheries provided with a series of upright buckets and between which wheels the water is permitted to flow to rotate the wheels in opposite directions, with vertical shafts for the wheels, connecting gearing between the shafts to cause the wheels to rotate with proper relative speeds, vertical abutment walls having their forward portions curved to closely surround the forward and outer parts of the wheels and form a tapering throat directed between the wheels so that the water is guided intermediate of the wheels and also having rearwardly extending parts arranged at a gradually increasing distance from the wheels and forming a large discharge aperture to the rear of the wheels and throat portion, and a duplication of all of the foregoing elements arranged immediately to the rear thereof so that the water which passes through the first pair of wheels is delivered to the second pair.

5. In a wave or current motor, the combination of two vertical wheels having their peripheries provided with a series of upright buckets and between which wheels the water is permitted to flow to rotate the wheels in opposite directions, with vertical shafts for the wheels, connecting gearing between the shafts to cause the wheels to rotate with proper relative speeds, vertical abutment walls having their forward portions curved to closely surround the forward and outer parts of the wheels and form a tapering throat directed between the wheels so that the water is guided intermediate of the wheels and also having rearwardly extending parts arranged at a gradually increasing distance from the wheels and forming a large discharge aperture to the rear of the wheels and throat portion, a duplication of all of the foregoing elements arranged immediately to the rear thereof so that the water which passes through the first pair of wheels is delivered to the second pair, and additional side passages between the abutments of the first pair of wheels and the abutments of the second pair of wheels for delivering water from the outside of the abutments to the throat of the abutments of the second pair of wheels to assist the water passing from the first set of wheels to rotate the second pair of wheels.

6. In a wave or current motor, the combination of two vertical wheels having their peripheries provided with a series of upright buckets and between which wheels the water is permitted to flow to rotate the wheels in opposite directions, with vertical shafts for the wheels, connecting gearing between the shafts to cause the wheels to rotate with proper relative speeds, vertical abutment walls having their forward portions curved to closely surround the forward and outer parts of the wheels and form a tapering throat directed between the wheels so that the water is guided intermediate of the wheels and also having rearwardly extending parts arranged at a gradually increasing distance from the wheels and forming a large discharge aperture to the rear of the wheels and throat portion, a duplication of all of the foregoing elements arranged immediately to the rear thereof so that the water which passes through the first pair of wheels is delivered to the second pair, separate air compressors driven by each pair of wheels, and a common reservoir for the compressed air from both compressors.

7. In a wave or current motor, the combination of two pairs of wheels having vertical shafts and between the wheels of each pair the water is caused to pass for rotating the wheels in opposite directions and in which one pair of wheels is arranged back of the other pair so that the water which passes between the first pair of wheels will pass between the second pair of wheels, with vertical abutment walls about each pair of wheels, and in which said abutment walls provide tapering throats at their forward outer faces to direct the water between the two wheels of the pair and in which the abutment walls of one pair of wheels are separated from the abutment walls of the next set of wheels in the rear to provide lateral passage ways for the entrance of water to the throat of the abutments of the second or rear pair of wheels.

8. In a wave or current motor, the combination of two pairs of wheels having vertical shafts and between the wheels of each pair the water is caused to pass for rotating the wheels in opposite directions and in which one pair of wheels is arranged back of the other pair so that the water which passes between the first pair of wheels will pass between the second pair of wheels, with vertical abutment walls about each pair of wheels, and in which said abutment walls provide tapering throats at their forward outer faces to direct the water between the two wheels of the pair and in which the abutment walls of one pair of wheels are separated from the abutment walls of the next set of wheels in the rear to provide lateral passage ways for the entrance of water to the throat of the abutments of the second or rear pair of wheels and in which the rear parts of the vertical abutment walls of each pair of wheels is extended rearwardly to a distance from the wheels and separated to form a discharge passage of greater width than the throat.

In testimony of which invention, I hereunto set my hand.

JAMES E. BENNETT.

Witnesses:
R. M. HUNTER,
R. M. KELLY.